(12) United States Patent
Schaefer et al.

(10) Patent No.: US 7,874,309 B2
(45) Date of Patent: Jan. 25, 2011

(54) COMPRESSOR

(75) Inventors: Tilo Schaefer, Daubach (DE); Georg Weber, Egelsbach (DE); Thomas Di Vito, Wehrheim (DE); Jan Hinrichs, Friedrichsdorf (DE); Uwe Becker, Butzbach (DE); Willi Parsch, Seeheim (DE); Bjoern Fagerli, Rodheim (DE)

(73) Assignee: Luk Fahrzeug-Hydraulik GmbH & Co. KG, Bad Homburg (DE)

( * ) Notice: Subject to any disclaimer, the term of this patent is extended or adjusted under 35 U.S.C. 154(b) by 899 days.

(21) Appl. No.: 10/534,151

(22) PCT Filed: Oct. 31, 2003

(86) PCT No.: PCT/DE03/03632

§ 371 (c)(1),
(2), (4) Date: Nov. 4, 2005

(87) PCT Pub. No.: WO2004/042232

PCT Pub. Date: May 21, 2004

(65) Prior Publication Data
US 2006/0124170 A1 Jun. 15, 2006

(30) Foreign Application Priority Data
Nov. 7, 2002 (DE) .................. 102 51 803

(51) Int. Cl.
F16K 17/40 (2006.01)
F16K 21/02 (2006.01)

(52) U.S. Cl. ....................... 137/71; 137/513.5

(58) Field of Classification Search .............. 137/68.19, 137/71, 515.3, 515.5, 515.7, 513.3, 513.5, 137/513.7; 417/435
See application file for complete search history.

(56) References Cited

U.S. PATENT DOCUMENTS

| 1,806,356 | A | * | 5/1931 | Lynn et al. | 137/513.3 |
|---|---|---|---|---|---|
| 2,451,385 | A | * | 10/1948 | Groat | 137/513.3 |
| 3,520,330 | A | * | 7/1970 | Szwargulski | 137/513.3 |
| 3,872,875 | A | * | 3/1975 | Raidl, Jr. | 137/71 |
| 3,883,030 | A | * | 5/1975 | Mathews et al. | 137/513.5 |
| 4,532,768 | A | * | 8/1985 | Focqueur | 137/519.5 |
| 4,633,681 | A | * | 1/1987 | Webber | 137/513.5 |
| 4,819,683 | A | * | 4/1989 | Buffham et al. | 137/71 |
| 5,542,261 | A | * | 8/1996 | Albertson et al. | 62/174 |
| 5,577,389 | A | * | 11/1996 | Albertson et al. | 137/71 |
| 5,768,895 | A | | 6/1998 | Albertson et al. | 62/77 |
| 5,782,259 | A | | 7/1998 | Ledbetter et al. | 137/71 |
| 6,178,759 | B1 | * | 1/2001 | Key | 137/68.19 |
| 2002/0096210 | A1 | * | 7/2002 | Schwarz et al. | 137/71 |
| 2003/0223883 | A1 | | 12/2003 | Weber et al. | 417/213 |

FOREIGN PATENT DOCUMENTS

EP 1 225 381 7/2002
WO 02/02942 1/2002

* cited by examiner

Primary Examiner—John Rivell
(74) Attorney, Agent, or Firm—Davidson, Davidson & Kappel LLC

(57) ABSTRACT

The invention relates to a compressor, particularly for air conditioners in motor vehicles, comprising a safety device for limiting high pressure, whereby the safety device is hermetically sealed until first responding, after which it slowly reduces the system pressure.

9 Claims, 1 Drawing Sheet

COMPRESSOR

The present invention is directed to a compressor, in particular for air-conditioning systems in motor vehicles, having a safety device for limiting high pressure.

BACKGROUND

Compressors of this kind are generally known. Thus, there are compressors which discharge the entire refrigerant-oil mixture to the environment by way of rupture disks, which burst in response to the maximum pressure being exceeded. These compressors have the disadvantage that, once the rupture disk has been actuated, vehicles having a coupling-free compressor, for example, are no longer able to be driven without the risk of compressor damage occurring.

In addition, compressors having pressure relief valves for the refrigerant R134A are known. However, their design is not directly transferable to air-conditioning systems which use the refrigerant $CO^2$, without risking considerable leakage rates already in the newly manufactured condition. In addition, the pressure relief valves currently used for the refrigerant R134A have the problem of the imperviousness being substantially degraded after a one-time actuation.

SUMMARY OF THE INVENTION

An object of the present invention is to devise a compressor which will overcome disadvantages of the prior art.

The present invention provides a compressor, in particular for air-conditioning systems in motor vehicles, having a safety device for limiting high pressure, the high-pressure limitation being hermetically sealed up until the first response, and the system pressure dropping slowly after that. It is thus achieved that the compressor is not damaged even during further operation. A compressor is preferred in which the safety device includes a combination of a rupture disk and a pressure relief valve. In accordance with the present invention, the rupture disk and the pressure relief valve are arranged in series. The rupture disk is pressurized on one side with the high pressure from the exhaust chamber of the compressor, while it is pressurized on the other side with atmospheric pressure. Viewed from the high-pressure side, the pressure relief valve is configured downstream of the rupture disk.

In addition, a compressor is preferred in which the pressure relief valve is designed for valve-opening pressure that may be clearly lower than the bursting pressure of the rupture disk. The pressure relief valve vents to the atmospheric side. In addition, a compressor is preferred in which the pressure relief valve has a defined leakage, while the rupture disk is hermetically sealed. The advantage of the pressure relief valve having a defined leakage is that no pressure is able to build up in the space between the rupture disk and valve, as long as the rupture disk is intact. Thus, the response characteristic of the rupture disk is not affected.

Also, a compressor is preferred, in which the defined leakage is able to be achieved by a valve seat or a valve piston of the pressure relief valve, made of porous material. In addition, a compressor is preferred, in which the defined leakage of the pressure relief valve is able to be achieved by a bypass groove or a bypass bore, or by a surface irregularity or a surface roughness in the area of the valve seat or valve piston. In addition, the defined leakage may be realized by the permeability of an elastomer seal 27 at the valve seat or valve piston. A compressor in accordance with the present invention has the distinguishing feature that, after dropping below the set pressure, the residual refrigerant contained in the system is released by the pressure relief valve only still slowly, via the leakage site. This slow, controlled discharging of the gas ensures that the system remains operational to a limited degree for a certain time, and that the user has time to drive to a service station without risking compressor damage. Such compressor damage would otherwise occur, because refrigerant that leaks out suddenly would entrain the oil and cause the compressor lubrication to fail.

BRIEF DESCRIPTION OF THE DRAWINGS

The present invention is described in greater detail below with reference to the drawing, in which.

DETAILED DESCRIPTION

Figure 1:
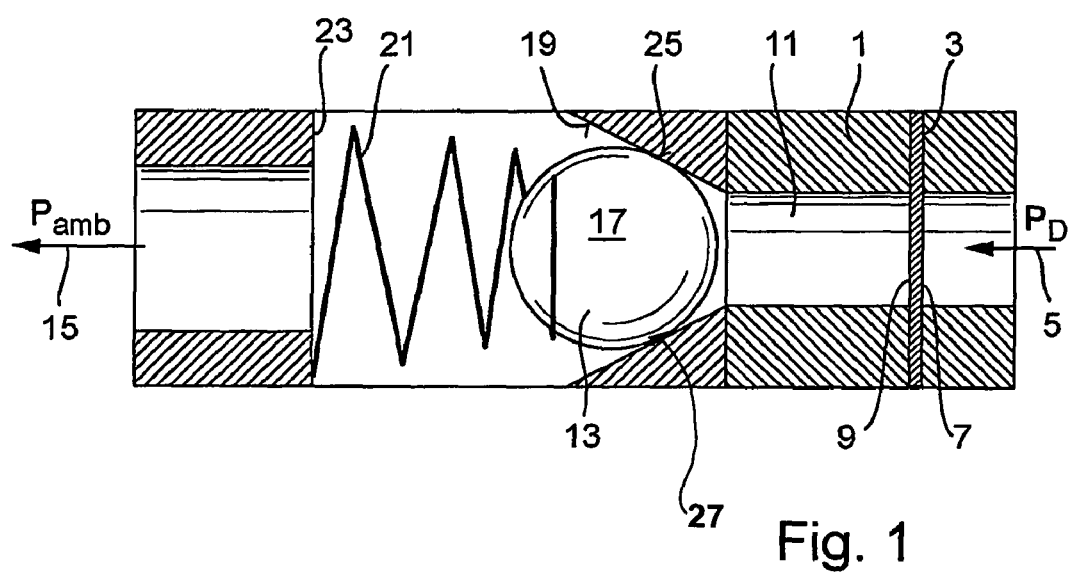
FIG. 1 shows a compressor according to one embodiment of the present invention.

The figure shows a housing part 1, which may be an integrated component of a compressor housing, for example. Embedded in housing part 1 is a rupture disk 3, which is pressurized on its side 7 by high pressure 5 prevailing in the exhaust region of the compressor. On side 9 of the rupture disk, i.e., in region 11 of the safety device, the rupture disk is pressurized in the intact state with atmospheric pressure 15, since pressure relief valve 13 does not close in a leak-tight manner, enabling atmospheric pressure 15 to prevail up to region 11. As illustrated here for example, pressure relief valve 13 may be composed of a spherical valve body 17 and a conical valve seat 19, spherical valve body 17 being pressed by a spring 21 into valve seat 19. The preloading of spring 21, which determines the opening pressure of pressure relief valve, may be adjusted by a suitable supporting surface 23 for spring 21. In this context, pressure relief valve 13 is set to an opening pressure which is clearly below the bursting pressure of rupture disk 3, so that it opens immediately in response to actuation of the rupture disk. It is intended for pressure relief valve 13 to have a defined leakage site in sealing region 25 between valve seat 19 and valve body 17, so that it does not provide hermetic sealing action. This leakage site may be constituted of a porous material for seat 19 or for spherical valve body 17, as well as of a bypass groove in region 25 or of a bypass bore, or of an appropriate surface condition, surface roughness and similar structures, such as elastomer seal 27, which render possible a small amount of leakage in region 25 and thus, given an intact rupture disk, enable atmospheric pressure 15 to prevail up to valve region 11. When the bursting pressure of rupture disk 3 is exceeded, and rupture disk 3 bursts in response to high pressure 5 toward atmospheric pressure 15 and allows the refrigerant to escape from the compressor, the effluent refrigerant will then continue to flow off under the substantially lower set pressure of pressure relief valve 13 into the atmosphere until the opening pressure of the pressure relief valve set via the spring force is also undershot within the air-conditioning system. Pressure relief valve 13 subsequently moves again into a closed position, and the refrigerant remaining in the air-conditioning circuit, including the lubricant required for lubrication is only able to still leak out slowly and thus over a longer period of time via the leakage site in region 25. This slow, controlled discharging of the gas ensures that the system remains operational to a limited degree for a certain time, and that the user has time to drive to a service station without immediately risking compressor damage, since refrigerant and thus lubricant are still present in the system. This safety device has the further benefit of preventing the pressure prevailing inside the air-conditioning system from being suddenly relieved from maximum pressure to atmospheric pressure, so that refrigerant, which may still be in the high-pressure state within the seal material, cannot be diffused into the seals, for example, which could lead to explosive decompression and thus to destruction of the seals due to a sudden drop in pressure outside of the seal.

What is claimed is:

1. A compressor, comprising:
a safety device for limiting high pressure, wherein the safety device is hermetically sealed until a first response, and wherein the safety device allows a slow release of system pressure after the first response,
wherein a pressure relief valve has a defined leakage and wherein a rupture disk is hermetically sealed, the pressure relief valve comprising a valve seat, a valve piston, and further an elastomer seal that is permeable to a refrigerant at one of the valve seat and the valve piston, the elastomer seal configured to realize the defined leakage.

2. The compressor as recited in claim 1 wherein,
the rupture disk and the pressure relief valve form a region there-between, the rupture disk having a first side connected to a compressor chamber and a second side connected to the region, the rupture disk hermetically sealing the chamber from the region until a pressure of the compressor chamber exceeds a predetermined level, the pressure relief valve having the defined leakage of atmospheric pressure into the region while the pressure of the compressor chamber is below the predetermined level and configured to allow a slow release of the system pressure after the pressure of the compressor chamber exceeds the predetermined level.

3. The compressor as recited in claim 2, wherein the rupture disk and the pressure relief valve are arranged in series.

4. The compressor as recited in claim 3, wherein the compressor chamber is an exhaust chamber, and wherein the rupture disk is pressurized on one side with high pressure from the exhaust chamber and on the other side with the atmospheric pressure.

5. The compressor as recited in claim 3, wherein the pressure relief valve is configured downstream of the rupture disk from a high pressure side.

6. The compressor as recited in claim 2, wherein the pressure relief valve is configured to open at a lower opening pressure than a bursting pressure of the rupture disk.

7. The compressor as recited in claim 2, wherein the pressure relief valve is configured to vent a refrigerant of the compressor to the atmosphere.

8. The compressor as recited in claim 2, wherein the defined leakage is sufficient to prevent a pressure build up in the region when the rupture disk is intact.

9. The compressor as recited in claim 2, wherein the pressure relief valve is configured to slowly release a residual refrigerant of the compressor through the defined leakage in response to the pressure in the air-conditioning system dropping below a set pressure.

* * * * *